3,324,065
POLYVINYL ALCOHOL ADHESIVES
Andrew Earl Pierce, Topsfield, Mass., assignor to The Borden Company, New York, N.Y., a corporation of New Jersey
No Drawing. Filed Oct. 18, 1965, Ser. No. 497,547
4 Claims. (Cl. 260—29.6)

This application is a continuation-in-part of my copending application, Ser. No. 118,517, filed June 21, 1961, now United States Letters Patent No. 3,213,051.

This invention relates to polyvinyl alcohol adhesive compositions and to structures using such adhesives and, in particular, to tackified polyvinyl alcohol adhesive compositions.

Heretofore, boron compounds have been added to polyvinyl alcohol compositions to increase the viscosity and wet tack but the results have not been entirely satisfactory primarily because boron compounds, such as boric acid, cause the polyvinyl alcohol to thicken excessively and to gel. Attempts have been made to control viscosity by the use of acids to keep the pH of the adhesives below 5.5, but this is limited in that high levels of polyvinyl alcohol must be used and the adhesives cannot contain more than about 15% of boric acid based on the weight of polyvinyl alcohol, thereby limiting the viscosities and wet tack that can be obtained.

It has now been found that polyvinyl alcohol adhesives modified with boron compounds can be prepared with wider operating viscosities, levels of boron compound above 15%, based on weight of polyvinyl alcohol, and which do not require regulation of pH.

Briefly stated, the invention comprises polyvinyl alcohol adhesive compositions of the kind described herein and in which modification is effected by water soluble gelation retarder.

The polyvinyl alcohol used is any commercial variety and is the hydrolysis product of polyvinyl acetate. Used to advantage is polyvinyl alcohol representing polyvinyl acetate that is hydrolyzed to the extent of about 76–99% or over, although polyvinyl alcohol of lower or higher degree of hydrolysis may be used.

As the setting or tackifying accelerator, I know of no substitute for water soluble boron compounds, of which boric acid is preferred. This may be supplied as commercial or pure boric acid or as a compound which, in water, hydrolyzes and develops boric acid, as for instance any of the commercial alkyl esters of boric acid or a borate of strongly acidic nature, such as the borate of aluminum or other metal of low electropositivity, examples being titanium or zirconium. Sodium borate and metaborate can be used if sufficient acid is added to bring pH down to pH 6.0.

The gelation (or tackifying) retarder that is recommended for commercial use is ammonium or sodium, potassium, lithium or other alkali metal thiocyanate. Another that may be used is urea although it is less effective as a retarder than the thiocyanates.

In addition to these essential components, we may also and ordinarily do include other conventional ingredients for their usual effects including the following: antifoaming agent, examples of which are tributyl citrate, pine oil, and dimethyl siloxane polymers; fillers as, for instance, kaolin, china or other non-swelling clay, and diatomaceous earth; and preservatives.

The following table shows the proportions of the essential components of the adhesive that are recommended and also a permissible range of proportions that are suitable for some uses of the adhesive. In this table and elsewhere herein proportions are expressed as parts by weight.

|  | Parts by weight | |
| --- | --- | --- |
|  | Recommended | Illustrative |
| For 100 parts PVOH: | | |
| Water soluble boron compound | 3–30 | 2–50 |
| Gelation retarding agent | 6–60 | 4–100 |

The gelation retarding agent should ordinarily not be used in proportions less than 150% by weight of the boron compound.

Proportions of the materials admixed to advantage for their usual effects are 10–300 parts and suitably 25–200 of filler such as clay, 0–0.5 and suitably 0.01–0.1 part of antifoamer, and 0.4–1 part or more of preservative.

Water is incorporated in amount required to adjust the solids to the percentage desired, about 15–30%, and to lower the viscosity of the finished adhesive to that selected for the application, as to about 300–4000 cps. and to dilute the adhesive to the extent that it will not become objectionably tacky during application.

So long as the pH is below that at which the boric acid is converted to a borate salt, with the extensive ionization characteristic of soluble salts such as borates, the pH is not the controlling factor in the stability and non-gelling properties of the adhesive emulsion. I have found, for example, that polyvinyl alcohol solutions containing 2 parts of polyvinyl alcohol and 2 parts of boric acid do not gel when the solution contains also either 10 parts of ammonium thiocyanate (giving a pH of 5.4 for the whole solution) or 10 parts of urea (making the pH 6). When, however, the thiocyanate or the urea are replaced by 10 parts of either formamide or dicyandiamide with the pH again 6, then the solutions gel although the pH is the same as that with the urea composition and the chemical similarity of the formamide and the dicyandiamide to urea is close.

Once these results have been observed, various theories may be advanced to explain the mechanism by which the thiocyanate and the urea function. I consider that the retardant thiocyanate and urea function alike in decreasing the accessibility of the polyvinyl alcohol to or its reactivity with the anion of boric acid, as by lyophilic action of the retarder in solvating the boric-acid-sensitive polyvinyl alcohol or by complexing the anion of boric acid which, it is noted, has a surplus of electrons which it can supply to the electron-deficient thiocyanate ion or nitrogen of the amide groups in urea. Whatever the exact explanation, the invention utilizes all of the effects of the retarding agent in preventing the usual thickening or gelling of polyvinyl alcohol compositions by boric acid admixed therewith while preserving the effectiveness of the boric acid in accelerating the setting of the whole polyvinyl acetate adhesive emulsion.

The invention will be further illustrated by description in connection with the following specific examples of the practice of it.

*Example 1*

An adhesive composition was made by admixing the following ingredients (proportions being on a dry basis) with water to 20% solids. It was compared with a "Control A" constituting no part of this invention which was also at 20% solids.

|  | | Control A |
|---|---|---|
| Polyvinyl alcohol | 25.0 | 25.0 |
| ASP-400 (kaolinite clay) | 72.5 | 73.0 |
| NH₄SCN | 1.5 | |
| Boric acid | 1.5 | 1.5 |
| Sulfamic acid | | .5 |
| Final pH | 5.8 | 4.9 |

The viscosity at temperatures indicated for the two compositions was as follows:

|  | Product of Example 1 | Control A |
|---|---|---|
| 170° | 100 | 100 |
| 160° | 100 | 100 |
| 150° | 100 | 100 |
| 140° | 100 | 100 |
| 130° | 100 | 200 |
| 120° | 200 | 200 |
| 110° | 200 | 200 |
| 90° | 300 | 3,000 |

The adhesives had a high wet tack and were equivalent in adhesive activity when used to adhere paper to paper.

*Example 2*

An adhesive composition was made by admixing the following ingredients (proportions being on a dry basis) with water to 20% solids. It was compared with a "Control B" constituting no part of this invention which was also at 20% solids.

|  | | Control B |
|---|---|---|
| Polyvinyl Alcohol | 38.7 | 38.7 |
| ASP-400 (kaolinite clay) | 58.4 | 58.4 |
| Boric acid | 2.4 | 2.4 |
| Sulfamic acid | | 0.5 |
| NH₄SCN | 4.0 | |
| Final pH | 5.8 | 4.9 |

The viscosity at temperatures indicated for the two compositions was as follows:

|  | Ahdesive of Example 2 | Control B |
|---|---|---|
| 170° | 600 | 700 |
| 160° | 800 | 700 |
| 150° | 900 | 800 |
| 140° | 1,000 | 1,000 |
| 130° | 1,200 | 1,200 |
| 120° | 1,500 | 1,400 |
| 110° | 2,000 | 1,700 |
| 90° | 3,100 | 2,400 |

*Example 3*

The formulation of Example 1 and Control A are used except that the level of boric acid is increased in both cases to 20% (on dry polyvinyl alcohol). Control A was adjusted to pH 4.7–4.9 with sulfamic acid and the formulation of Example 1 adjusted to contain 200% NH₄SCN (on H₃BO₃). Control A gelled on heating, but the formulation of this invention remained fluid and had a commercially acceptable viscosity.

*Example 4*

The procedure and composition of Example 1 are used except that the ammonium thiocyanate there used is replaced by an equal weight of each of the following retarders, used separately and in turn: sodium, potassium, and lithium thiocyanate.

It will be understood that it is intended to cover all changes and modifications of the examples of the invention herein chosen for the purpose of illustration which do not constitute departures from the spirit and scope of the invention.

What is claimed is:

1. An adhesive consisting essentially of water, polyvinyl alcohol, a water-soluble boron compound, and a retarder of premature gelation selected from the group consisting of alkali metal and ammonium thiocyanates and urea, the said boron compound and retarder being in the proportions by weight of 2–50 parts and 4–100 parts, respectively, for 100 parts of polyvinyl alcohol, and the ratio of retarder to boron compound being such to prevent gelation of the adhesive.

2. The adhesive of claim 1, the boron compound being boric acid and the retarding agent being ammonium thiocyanate.

3. An adhesive consisting essentially of an aqueous dispersion of 100 parts by weight polyvinyl alcohol, from about 3–30 parts by weight boric acid, and from about 6–60 parts by weight ammonium thiocyanate, the pH of the adhesive being approximately within the range 2–6 and the ammonium thiocyanate being used in a proportion of at least 100% by weight of the boric acid.

4. The adhesive of claim 3, containing from about 25 to about 200 parts by weight of clay.

References Cited

UNITED STATES PATENTS

| 2,671,022 | 3/1954 | Sargent et al. | 260—29.6 |
| 2,892,731 | 6/1959 | Claxton | 260—29.6 |
| 3,197,429 | 7/1965 | Baatz | 260—29.6 |

FOREIGN PATENTS

| 507,763 | 11/1954 | Canada. |

MORRIS LIEBMAN, *Primary Examiner.*

A. LIEBERMAN, *Assistant Examiner.*